US010678708B2

(12) United States Patent
Hannedouche et al.

(10) Patent No.: US 10,678,708 B2
(45) Date of Patent: Jun. 9, 2020

(54) ENCRYPTED RAID DRIVE MANAGEMENT

(71) Applicant: SEAGATE TECHNOLOGY LLC, Cupertino, CA (US)

(72) Inventors: Francois-Xavier Hannedouche, Haut de Seine (FR); Sylvain Sevamy, Paris (FR)

(73) Assignee: SEAGATE TECHNOLOGY LLC, Fremont, CA (US)

(*) Notice: Subject to any disclaimer, the term of this patent is extended or adjusted under 35 U.S.C. 154(b) by 263 days.

(21) Appl. No.: 15/890,536

(22) Filed: Feb. 7, 2018

(65) Prior Publication Data

US 2019/0243784 A1    Aug. 8, 2019

(51) Int. Cl.
*G06F 3/06* (2006.01)
*G06F 12/14* (2006.01)
*G06F 13/40* (2006.01)

(52) U.S. Cl.
CPC ........ *G06F 12/1408* (2013.01); *G06F 3/0622* (2013.01); *G06F 3/0629* (2013.01); *G06F 3/0689* (2013.01); *G06F 13/4045* (2013.01); *G06F 2212/1052* (2013.01)

(58) Field of Classification Search
CPC ..... H04L 9/0822; H04L 9/0827; H04L 9/083; H04L 9/0866; H04L 9/0894; H04L 9/0825
See application file for complete search history.

(56) References Cited

U.S. PATENT DOCUMENTS

| | | | |
|---|---|---|---|
| 8,646,054 B1 | 2/2014 | Karr et al. | |
| 2011/0154023 A1 | 6/2011 | Smith et al. | |
| 2012/0254602 A1 | 10/2012 | Bhansali et al. | |
| 2017/0085374 A1* | 3/2017 | Chen | H04L 9/083 |
| 2017/0093563 A1* | 3/2017 | Gazit | H04L 9/0861 |

* cited by examiner

*Primary Examiner* — Olugbenga O Idowu
(74) *Attorney, Agent, or Firm* — Westman, Champlin & Koehler, P.A.

(57) ABSTRACT

Systems and methods for management of a RAID system of encrypted storage drives are described. In one embodiment, the system may include self-encrypting drives (SEDs), redundant array of independent disks (RAID) chips, a drive interface bridge connecting between one of the RAID chips and a machine host, and a drive command initiator communicatively coupled to the drive interface bridge. In some embodiments, the drive command initiator may be configured to configure the one or more RAID chips in pass-through mode, unlock at least one of the SEDs while the one or more RAID chips are configured in pass-through mode, and upon unlocking at least one of the SEDs, configure the one or more RAID chips to RAID mode and activate a mass storage functionality of the drive interface bridge.

20 Claims, 7 Drawing Sheets

ENCRYPTED RAID DRIVE MANAGEMENT

SUMMARY

The present disclosure is directed to methods and systems for management of a redundant array of independent disks (RAID) system of encrypted storage drives. In some embodiments, the present systems and methods may include a solution to manage the unlocking and locking of the individual encrypted storage drives in a RAID system. In some cases, the encrypted drives may be behind several layers of RAID controller chips.

A storage system for management of a RAID system of encrypted storage drives is described. In one embodiment, the storage system may include a plurality of self-encrypting drives (SEDs), one or more redundant array of independent disks (RAID) chips, a drive interface bridge connecting between at least one of the one or more RAID chips and a machine host, and a drive command initiator communicatively coupled to the drive interface bridge. In some embodiments, the drive command initiator may be configured to configure the one or more RAID chips in pass-through mode, unlock at least one of the SEDs while the one or more RAID chips are configured in pass-through mode, and upon unlocking at least one of the SEDs, configure the one or more RAID chips to RAID mode and activate a mass storage functionality of the drive interface bridge.

In some cases, the unlocking of at least one of the SEDs may include performing an unlocking sequence, the unlocking sequence including at least receiving an unlocking command and sending an encryption key to the at least one SED. In one embodiment, encryption on an SED may include one or more encryption systems. For example, one encryption system may be configured to encrypt data stored on an SED, where the data encryption key never leaves the SED target. The same encryption system or an additional encryption system may include a communication encryption key configured to encrypt communications between drive command initiator and SED target, where the communication encryption key is different than the data encryption key. In some cases, the communication encryption key may be specific to a particular SED target. In some examples, the communication encryption key may be exchange between the drive command initiator and SED target at the beginning of an unlock process. In the same encryption system or an additional encryption system, the password may be known only to the SED target data owner and may be requested by the drive command initiator, encrypted using the communication encryption key, then sent to SED target and finally used by SED target to unlock the data encryption key. In some cases, the data encryption key and/or communication encryption key may be specific to a particular SED. In some cases, at least a portion of the data encryption key and/or communication encryption key may be randomly generated.

In some examples the encryption key may be unique to a particular SED from the plurality of SEDs. In some cases the drive command initiator may be further configured to receive a request to unlock access to the SEDs from the drive interface bridge. In some examples, the request may include a drive interface request for access via the drive interface bridge to data encrypted on at least one of the SEDs.

In some cases, the drive command initiator may be further configured to block drive interface access to the SEDs via the drive interface bridge while the one or more RAID chips are configured to pass-through mode.

In some embodiments, the drive command initiator may be further configured to unlock drive interface access to the SEDs via the drive interface bridge after the one or more RAID chips are configured to RAID mode and the unlocking of the at least one SED. In some embodiments, the drive command initiator may be further configured to enable the drive interface bridge to present the SEDs to the machine host after at least one SED of the plurality of SEDs is unlocked and at least one of the one or more RAID chips is configured to RAID mode.

In some embodiments, the one or more RAID chips may include a first RAID chip, a second RAID chip, and a third RAID chip. In some cases, the first RAID chip may connect between the third RAID chip and a first pair of SEDs from the plurality of SEDs, wherein the first RAID chip makes the first pair of SEDs appear as a first effectively single SED to the third RAID chip. In some cases, the second RAID chip may connect between the third RAID chip and a second pair of SEDs from the plurality of SEDs, wherein the second RAID chip makes the second pair of SEDs appear as a second effectively single SED to the third RAID chip. In some examples, the third RAID chip may make the first effectively single SED and the second effectively single SED appear as a single RAID drive to the drive interface bridge.

An apparatus for management of a RAID system of encrypted storage drives is also described. In one embodiment, the apparatus may include a drive command initiator, memory in electronic communication with the drive command initiator, and instructions stored in the memory, the instructions being executable by the drive command initiator to configure one or more RAID chips in pass-through mode, unlock at least one of a plurality of self-encrypting drives (SEDs) while the one or more RAID chips are configured in pass-through mode, and upon unlocking at least one of the SEDs, configure the one or more RAID chips to RAID mode and activate a mass storage functionality of a drive interface bridge of the apparatus.

A method for management of a RAID system of encrypted storage drives is also described. In one embodiment, the method may include configuring one or more RAID chips in pass-through mode, unlocking at least one of a plurality of self-encrypting drives (SEDs) while the one or more RAID chips are configured in pass-through mode, and upon unlocking at least one of the SEDs, configuring the one or more RAID chips to RAID mode and activating a mass storage functionality of a drive interface bridge of the apparatus. In some cases, the unlocking of at least one of the SEDs may include performing an unlocking sequence. In some examples, the unlocking sequence may include at least receiving an unlocking command from the drive interface bridge and sending an encryption key to the at least one SED.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
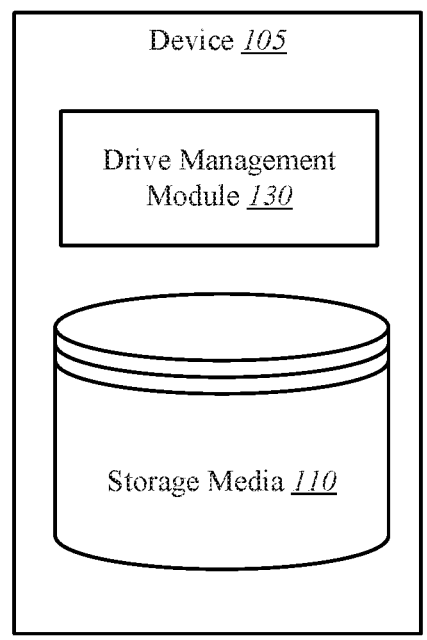
FIG. 1 is a block diagram of an example of a system in accordance with various embodiments.

The following relates generally to management of a redundant array of independent disks (RAID) system of encrypted storage drives. In one embodiment, the following relates to one or more self-encrypting drives (SEDs) in a RAID system.

Any given SED may be associated with one or more encryption keys. In one embodiment, an SED may be associated with a data encryption key and a drive encryption key. The SED may use the data encryption key to encrypt data stored on the SED. A user may use the drive encryption key to decrypt and unlock access to the drive and/or the data stored on the SED. Thus, in some cases, the drive encryption key may control access to the drive, while the data encryption key may control access to the data stored on the drive.

In some embodiments, the data encryption key may be encrypted by the drive encryption key. Thus, in some examples, the drive encryption key may unlock access to the data of the SED based at least in part on unlocking access to the data encryption key, which data encryption key may then be used to decrypt the encrypted data stored on the SED that is encrypted by the data encryption key.

In some embodiments, the drive encryption key may be use to lock and/or unlock access to the SED. In some examples, a user, administrator, computing device, mobile computing device, and/or network machine may use the drive encryption key to gain access to the drive and enable decryption of the encrypted data stored on the SED.

In some embodiments, the drive encryption key may be used to encrypt or decrypt the data encryption key. The drive encryption key is typically not stored on the SED. For example, the drive encryption key is typically not stored in plaintext inside the SED. In some cases, the SED may store a cryptographic hash of the drive encryption key to enable the SED to recognize when a correct drive encryption key is provided. For example, a user may enter a passcode (e.g., the drive encryption key) and the SED may create a hash of the provided passcode.

In some embodiments, the SED may compare the hash of the provided passcode with the stored hash of the drive encryption key. When the hash of the provided passcode matches the stored hash of the drive encryption key, the SED may unlock access to the drive, enabling decryption of the encrypted data stored on the SED by the data encryption key. In some cases, once the SED determines the hash of the provided passcode matches the stored hash of the drive encryption key, the SED may use the data encryption key to decrypt the encrypted data stored on the SED.

In one embodiment, the present systems and methods may include a redundant array of independent disks (RAID) system of encrypted storage drives (e.g., two or more SEDs) with no solution to manage the unlocking and locking of the individual encrypted storage drives exists. In such a RAID system, the SEDs may be behind two or more layers of cascaded RAID chips. In some embodiments, a particular RAID chip may make two or more storage drives connected on one side of the particular RAID chip appear as a single storage drive on another side of the particular RAID chip. For example, a first pair of SEDs may be behind a first RAID chip, a second pair of SEDs may be behind a second RAID chip, and the first and second RAID chips may be behind a third RAID chip. Thus, in some cases, the multiple RAID chips may make several SEDs appear as a single RAID drive. However, a RAID chip may not be capable of handling encryption and decryption of data stored on SEDs. In some cases, a RAID chipset may not be capable of sending lock/unlock commands to an SED. In some embodiments, sending lock/unlock commands includes a certain encryption/decryption capability that a RAID chipset lacks. A particular RAID chip may be configured to identify the multiple SEDs as a single RAID storage drive, and as a result the RAID chip may not be capable of identifying an individual SED drive or individually unlock each SED drive. As a result, the encrypted data stored on the multiple SED drives behind the multiple RAID chips may be inaccessible to a user.

In one embodiment, each RAID chip may not be configured to interpret unlocking commands sent in a particular format or programming language (e.g., object oriented programming language such as optimized applicative language (OPAL), etc.). Accordingly, the RAID chips may prevent access to individual SEDs.

Even when a single passcode is used to unlock each of the SEDs in a particular system (e.g., each of the SEDs has the same drive encryption key), the unlocking sequence may be different for each SED in the system. Accordingly, broadcasting the passcode as part of an unlock sequence would fail to unlock each of the SEDs. In some cases, a particular unlock sequence of an SED may be too complicated for some RAID chips to process, even with custom firmware. In some examples, an external interface of the present systems and methods may include a drive access interface. As a result, a conventional system may not be able to pass serial advanced technology attachment (SATA) commands through the RAID chips to the individual SEDs over the drive access interface. Examples, of the drive access interface may include a universal serial bus (USB) interface, THUNDERBOLT® interface, FIREWIRE® interface, SATA interface, Ethernet interface, peripheral component interconnect (PCI) express, or any combination thereof.

In some embodiments, SED data transfer between a host and a device (e.g., SED target) may be encrypted with a per-disk randomized key. Even when the password to unlock multiple or all SEDs in a given RAID system may be the same, data transfer used to handle the decryption-based data transfer would still be different between the host and each drive, resulting in the data being understood only by the intended target.

In one embodiment, an initiator (e.g., a host computing system) and a target (e.g., SED) may setup an encryption key and this setup may be different with every target of a RAID system (e.g., different encryption key for each target or SED). In one embodiment, when the initiator sends one or more SED commands with a password to a target to unlock the target, the one or more SED commands may be encrypted so that only the target can decrypt the one or more SED commands and read the password being sent with the one or more SED commands. Accordingly, even when the encryption key is the same for two or more drives, the initiator still accesses and unlocked each SED individually.

In some embodiments, SED commands may include a negotiation process between each SED and host (e.g., for registering a device and/or reserving system resources). In some cases, a negotiation process between a first SED and a host may differ from a negotiation process between a second SED and a host. In some cases, an unlocking sequence of a particular SED may be based at least in part on the negotiation process of the particular SED. Thus, an unlocking sequence of a first SED may differ from the unlocking sequence of a second SED.

In some cases, RAID systems may be used with removable disks, enabling a user to change or hot swap disks in the RAID system. In some cases, one removable SED may differ from another removable SED in configuration, storage size, password, etc. Accordingly, each SED may have its own unlocking sequence unique to each particular SED.

In one embodiment, a host may detect a RAID chipset (e.g., one or more RAID chips) in a RAID system. The RAID system may include a RAID volume of SEDs (e.g., multiple SEDs in the RAID system recognized as a single drive by the host when the multiple SEDs are accessible to the host). However, the SEDs may be locked or inaccessible to the host due to the encrypted data on the SEDs being behind multiple layers of RAID chips and/or a drive interface bridge that interfaces the RAID system to a host system. For example, the drive interface bridge may include a data bridge interface between a RAID system of SEDs and a host system. Thus, the RAID chipset of the RAID system may be unable to read the SEDs and unable to show a RAID volume to the host. One example of an unlock sequence in this situation may include: (1) a host detecting a RAID chipset; (2) drive command initiator communicating through the RAID chips to each SED individually; (3) drive command initiator unlocking each SED individually (e.g., sending encrypted commands and passcode to each SED); (4) upon unlocking each SED, each SED requests an associated RAID chip to mount the SEDs (e.g., a first pair of SEDs are mounted by a first RAID chip; a second pair of SEDs are mounted by a second RAID chip; a third RAID chip mounts the first pair and second pair as a RAID volume, etc.); (5) RAID chipset mounts the RAID volume on the host; (6) at least one SED of multiple SEDs in the RAID system and the data of the at least one SED (e.g., decrypted data) is accessible by the host and identified by the host as a single storage drive (e.g., the RAID volume).

In one embodiment, the present systems and methods include a drive command initiator to overcome the shortcomings of conventional RAID systems of encrypted storage drives. In one embodiment, the drive command initiator may include at least one of hardware components, firmware components, or software components, or any combination thereof. In one example, the drive command initiator may include software code executing on the host machine to perform at least a portion of the operations described herein. In some examples, the hardware components may include at least one of processors, memory, or storage, or any combination thereof. In some cases, the drive command initiator may include at least one of a central processing unit (CPU), a microcontroller, an application-specific integrated circuit (ASIC), field programmable gate array (FPGA), digital signal processor (DSP), or other programmable logic device, discrete gate or transistor logic, discrete hardware components, or any combination thereof designed to perform the functions described herein. In some cases, the drive command initiator may be connected externally to or added inside a drive interface bridge to provide SED features despite the embedded RAID chips. In some cases, the drive interface bridge may be part of the external interface of the present systems and methods and/or part of a drive access interface of the present systems and methods. In some examples, the drive command initiator may connect directly to one or more RAID chips and may send one or more commands directly to RAID chips. In some cases, the drive command initiator may be dedicated to unlocking access to the SEDs through the drive interface bridge and multiple layers of RAID chips.

In some embodiments, the drive command initiator may be configured to interpret unlocking commands sent in a particular format or programming language (e.g., object oriented programming language such as OPAL, etc.). In some examples, the drive command initiator may be configured to access each SED individually. In some cases, the drive command initiator may be configured to communicate individually with each SED. In some cases, the drive command initiator may be configured to communicate individually with each RAID chip. For example, in some cases the drive command initiator may modify a configuration of each RAID chip individually and/or collectively. In some examples, the drive command initiator may be configured to communicate with the RAID chips and/or the SEDs through the drive interface bridge.

In some embodiments, the drive command initiator may be configured to switch a RAID controller from a first mode to a second mode. In some cases, the drive command initiator may be configured to switch a RAID controller from the second mode back to the first mode. In some embodiments, the drive command initiator may be configured to switch a RAID controller from a second mode to a third mode. As one example, the drive command initiator may switch a RAID controller to a pass-through mode. In one embodiment, placing a RAID controller in pass-through mode may include configuring the drive interface bridge to permit the drive command initiator access to each SED drive individually. One example of placing a RAID controller in pass-through mode may include placing the RAID controller in a port multiplier mode. In some cases, the RAID controllers of a particular system may revert to the pass-through mode by default. For example, the drive command initiator may reset the RAID controllers. In some cases, when a RAID controller is reset, the RAID controller may be configured to the pass-through mode by default. In some cases, the drive interface bridge may be locked when the RAID chips are in pass-through mode. Alternatively, the drive interface bridge may be locked when the RAID chips are reset. When the drive interface bridge is locked, drive interface access to the RAID drive may be blocked. In one embodiment, the drive command initiator may be configured to forbid the drive interface bridge from presenting the SEDs to the host until the SEDs have been unlocked and RAID chips configured to RAID mode. In some embodiments, the drive command initiator may be further configured to allow the drive interface bridge to present the SEDs after at least one SED has been unlocked and one or more RAID chip(s) configured to raid mode.

When the RAID controllers are in pass-through mode, the drive command initiator may perform an unlocking sequence to unlock access to an SED. When an SED is locked, the encrypted data on the SED may be inaccessible to the RAID controllers and/or drive interface bridge. In some cases, an SED may be invisible to the drive interface bridge when the SED is locked. Thus, when the SEDs are locked the drive interface bridge may identify the RAID drive as a simulated storage drive, which may at least result in power being provided from a host of the RAID drive to the SEDs through the drive interface bridge. However, the drive command initiator may perform an unlocking sequence to unlock at least one of the SEDs in the system. In some cases, the drive command initiator may perform a separate unlocking sequence for each SED in the system.

In some embodiments, the drive command initiator may be configured to switch the RAID controllers from pass-through mode to RAID mode. In some cases, the drive command initiator may switch the RAID chips to RAID mode after the SEDs are unlocked. As one example, the drive command initiator may be configured to configure the RAID controllers to RAID0 mode. In some cases, the drive command initiator may unlock the drive interface bridge after the SEDs are unlocked. In some cases, the drive command initiator may activate a mass storage functionality of the drive interface bridge after unlocking the drive interface bridge. In some cases, activating a mass storage functionality of the drive interface bridge may include making a RAID volume made of aggregated unlocked SEDs accessible to a host of the RAID volume. Additionally or alternatively, the drive command initiator may enable the drive interface bridge to present the SEDs disks to the host after at least one SED has been unlocked and/or at least one RAID chip has been configured to RAID mode.

In one embodiment, the RAID chips may include a SATA RAID port multiplier controller. The SATA RAID port multiplier may support one host port and two devices ports, and may be used for SATA port expansion and performance aggregation. The SATA RAID port multiplier may support RAID0 (Strip), RAID1 (Mirror), RAID3, RAID5, RAID10, just a bunch of disks (JBOD), JBOD SPAN, JBOD BIG, Clone (RAID1+Spare), or any combination thereof. As one example, the present systems and methods may include a USB/SATA portable storage system with four SEDs internally managed as (2×RAID0)×2 and seen as a single SATA storage drive outside the drive interface bridge.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiments, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof.

In some configurations, device 105 may include drive management module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system (e.g., a computer tower with a processor, main memory, storage, etc.), or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, device 105 may include a wired and/or a wireless connection to an external database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof.

In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Drive management module 130 may be configured to manage encrypted storage drives in a RAID system. In some cases, drive management module 130 may use a sentry and/or USB based solution. In one embodiment, drive management module 130 may perform one or more operations in conjunction with a drive command initiator. In some cases, the drive command initiator may be customized and/or dedicated to the management of encrypted drives in a RAID system. In some cases, drive management module 130 may perform one or more operations in conjunction with a drive interface bridge. In one embodiment, drive management module 130 may be configured to process and communicate software commands individually with each encrypted drive in the RAID system. In one example, the software commands may include commands based on an object oriented programming language such as optimized applicative language (OPAL), etc.). In some embodiments, the drive interface bridge may be situated between the drive command initiator and the one or more encrypted drives of the RAID system. In some cases, drive management module 130, in conjunction with the drive command initiator, may communicate with the encrypted drives through the drive interface bridge. In one embodiment, the RAID system may include one or more RAID chips. In one example, the RAID chips may be between the drive interface bridge and the encrypted drives. In one embodiment, drive management module 130, in conjunction with the drive command initiator, may communicate with the encrypted drives through the drive interface bridge and the RAID chips. In some cases, drive management module 130 may modify a configuration of the RAID chips.

Figure 2:
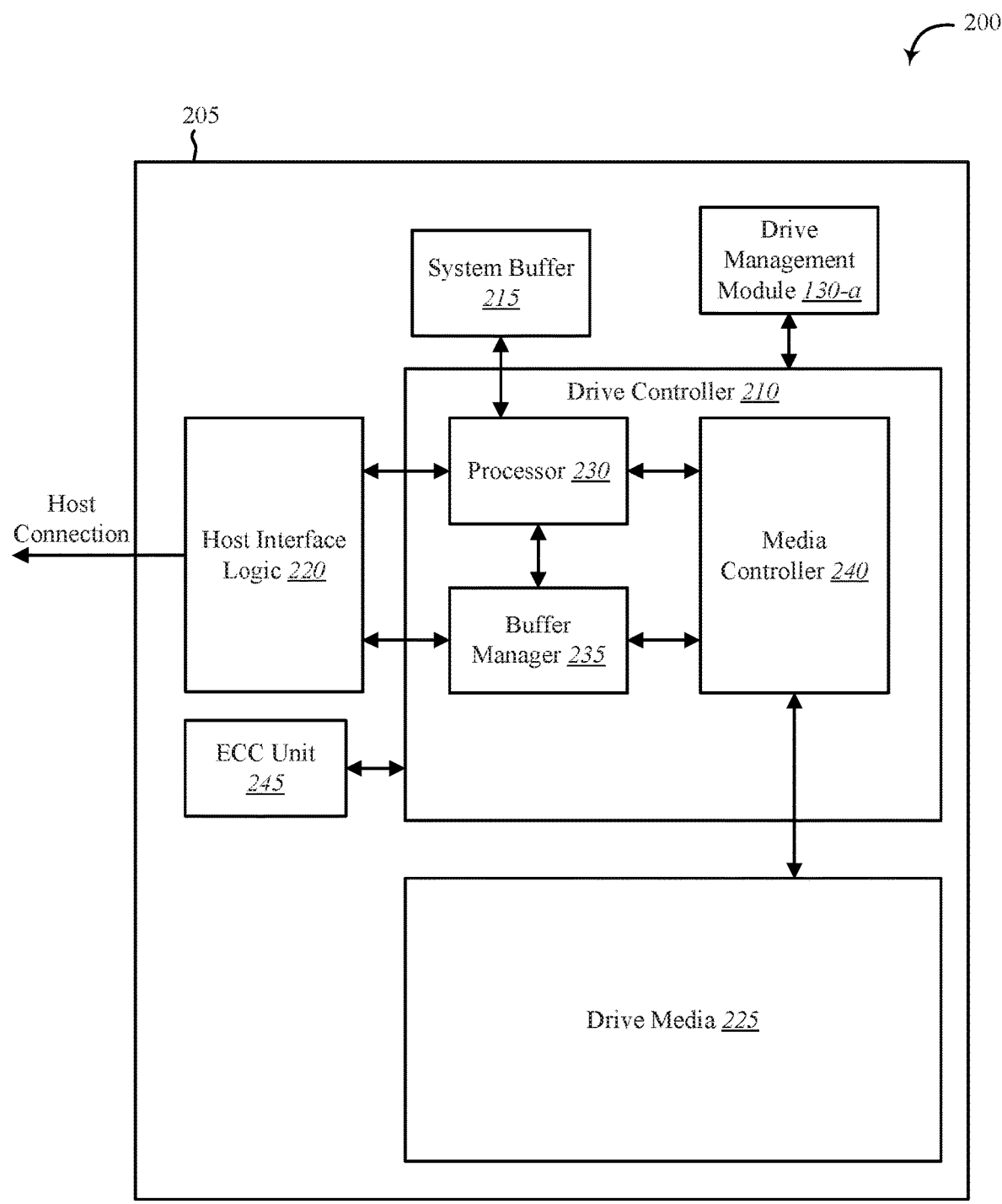
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and drive management module 130-*a*. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, drive management module 130-*a* may include at least one of one or more processors, one or more memory devices, one or more storage devices, instructions executable by one or more processors stored in one or more memory devices and/or storage devices, or any combination thereof. Although depicted outside of drive controller 210, in some embodiments, drive management module 130-*a* may include software, firmware, and/or hardware located within drive controller 210 and/or operated in conjunction with drive controller 210. For example, drive management module 130-*a* may operate in conjunction with and/or include at least a portion of processor 230, buffer manager 235, and/or media controller 240. In one example, drive management module 130-*a* may include one or more instructions executed by processor 230, buffer manager 235, and/or media controller 240.

Figure 3:
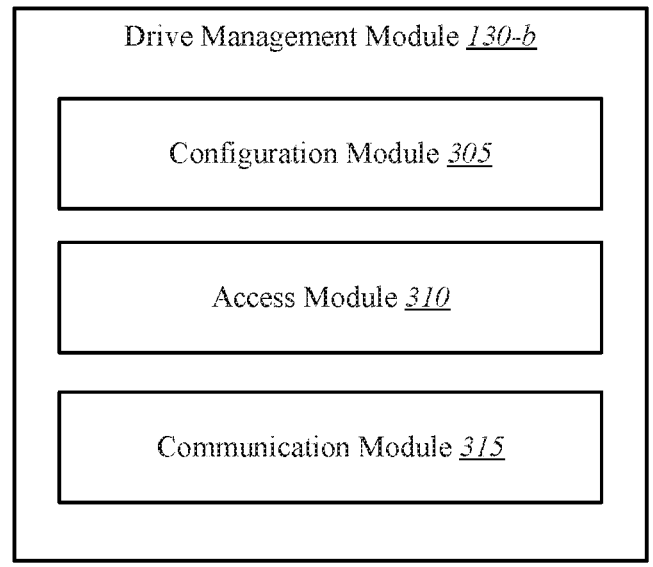
FIG. 3 shows a block diagram of one or more modules in accordance with various aspects of this disclosure.

FIG. 3 shows a block diagram of drive management module 130-*b*. The drive management module 130-*b* may include one or more processors, memory, and/or one or more storage devices. The drive management module 130-*b* may include configuration module 305, access module 310, and communication module 315. The drive management module 130-*b* may be one example of drive management module 130 of FIGS. 1 and/or 2. Each of these components may be in communication with each other.

In one embodiment, drive management module 130-*b* may perform one or more operations in conjunction with at least one of self-encrypting drives (SEDs), one or more redundant array of independent disks (RAID) chips, a drive interface bridge connecting between at least one of the one or more RAID chips and a machine host, and a drive command initiator communicatively coupled to the drive interface bridge, or any combination thereof. In some cases, the drive command initiator may be physically connected to the drive interface bridge, either within an enclosure of the drive interface bridge or external to the enclosure of the drive interface bridge.

In one embodiment, configuration module 305 may configure the one or more RAID chips in pass-through mode. In some cases, configuration module 305 may configure the one or more RAID chips as serial advanced technology attachment (SATA) port multipliers. In some embodiments, configuration module 305 may configure the one or more RAID chips in pass-through mode based at least in part on a reset of the one or more RAID chips.

In one embodiment, access module 310 may be configured to unlock at least one of the SEDs while at least one of the one or more RAID chips is configured in pass-through mode. In some cases, access module 310 may unlock each of the plurality of SEDs. In some cases, access module 310 may determine whether the SEDs are locked before performing an unlocking sequence to unlock the SEDs. In some cases, when access module 310 determines the SEDs are unlocked, access module 310 may bypass performing the unlocking sequence to unlock the SEDs. On the other hand, when access module 310 determines the SEDs are locked, access module 310 may perform the unlocking sequence to unlock the SEDs.

Upon unlocking at least one of the SEDs, configuration module 305 may configure the one or more RAID chips to RAID mode and activate a mass storage functionality of the drive interface bridge. In some cases, configuring the one or more RAID chips to RAID mode may include configuration module 305 resetting the RAID chips. In some examples, configuration module 305 may reset the RAID chips without resetting the SEDs or without power cycling the SEDs. In one example, configuration module 305 may use a configuration pin of a RAID chip to reset the RAID chip. For example, configuration module 305 may send one or more signals to a reset pin of a RAID chip. Upon receiving the one or more signals at the reset pin, the RAID chip may reset without a power cycling of the SEDs. In some cases, the one or more RAID chips may be configured to at least one RAID mode. The RAID mode may include at least one of RAID0, RAID1, RAID3, RAID5, RAID10, just a bunch of disks (JBOD), SPAN, Clone (RAID1+Spare), or BIG, or any combination thereof.

In some embodiments, access module 310 may be configured to access each SED individually. In some cases, access module 310 may have access to configuration pins of each RAID chip. In some cases, access module 310 may use the configuration pins of a particular RAID chip to configure the particular RAID chip to pass-through mode or RAID mode. For example, access module 310 may send one or more signals to a pin of the RAID chip to configure the RAID chip to pass-through mode or RAID mode.

In some embodiments, the one or more RAID chips may be in a host managed mode upon reset. Accordingly, in some cases, access module 310 may send one or more commands to the RAID chips to switch the RAID chips to pass-through mode from host managed mode. After unlocking at least one SED access module 310 may send one or more commands to the RAID chips to switch the RAID chips to RAID mode. In some cases, access module 310 may send commands to each of the RAID chips to switch each of the RAID chips to RAID mode. In connection with switching the RAID chips to RAID mode, access module 310 may unlock the drive interface bridge, making the data on the SEDs available to a host machine via the drive interface bridge. For example, once the SEDs are unlocked, the drive interface bridge is unlocked, and the RAID chips are switched to RAID mode, data on the SEDs may be accessed via one or more drive interface requests (e.g., USB request, THUNDERBOLT® request, FIREWIRE® request, SATA request, Ethernet request, or any combination thereof) received via the drive interface bridge.

In some embodiments, the unlocking of at least one of the SEDs by access module 310 may include access module 310 performing an unlocking sequence. In some cases, access module 310 performing the unlocking sequence may include at least access module 310 receiving an unlocking command and sending an encryption key to the at least one SED.

In some embodiments, the encryption key may be unique to a particular SED from the plurality of SEDs. As one example, a first SED may be associated with a first encryption key, a second SED may be associated with a second encryption key, and so forth. Thus, in some cases, the first SED may be unlocked using the first encryption key, but not the second encryption key. Similarly, the second SED may be unlocked using the second encryption key, but not the first encryption key. In some cases, the same single encryption key may be used to unlock the first SED and the second SED. In some examples, an unlocking sequence of the first SED may differ from an unlocking sequence of the second SED. Thus, even when the first SED and second SED may be unlocked by the same encryption key (e.g., a universal encryption key for a set of SEDs or for a RAID drive of SEDs), a first unlocking sequence using the universal encryption key may be used to unlock the first SED, and a second unlocking sequence using the universal encryption key may be used to unlock the second SED, where the second unlocking sequence is different from the first unlocking sequence in at least one aspect. In some cases, the first encryption key, second encryption key, and/or universal encryption key may be referred to as a drive encryption key. In some cases, an SED may encrypt/decrypt data stored on the SED using a data encryption key. In some cases, the data encryption key may be encrypted using a drive encryption key. Thus, in some examples the drive encryption key may unlock the data encryption key for a host, which may then unlock the data encryption key to decrypt data on the SED and provide the decrypted data to the host.

In one embodiment, communication module 315 may receive a request to unlock access to the SEDs from the drive interface bridge. For example, communication module 315 may establish a communication link with a host of SEDs. In one example, a host machine may physically connect to the drive interface bridge and communication module 315 may establish the communication link to the host over the drive interface bridge. In some cases, the request received by the communication module 315 may include a drive interface request for access via the drive interface bridge to data encrypted on at least one of the SEDs.

In one embodiment, access module 310 may be configured to block drive interface access to the SEDs via the drive interface bridge while the one or more RAID chips are configured to pass-through mode. For example, in some embodiments access module 310 may be configured to block a host from acquiring drive interface access to the SEDs via the drive interface bridge while the one or more RAID chips are configured to pass-through mode.

In one embodiment, access module 310 may be configured to unlock drive interface access to the SEDs via the drive interface bridge after the one or more RAID chips are configured to RAID mode. In some embodiments, access module 310 may be configured to unlock drive interface access to the SEDs via the drive interface bridge after both the one or more RAID chips are configured to RAID mode and the unlocking of the at least one SED. In some embodiments, access module 310 may be configured to enable the drive interface bridge to present the SEDs to the machine host after at least one SED of the plurality of SEDs has been unlocked and/or after at least one of the one or more RAID chips has been configured to RAID mode.

In some cases, the one or more RAID chips may include a first RAID chip, a second RAID chip, and a third RAID chip. In some embodiments, the first RAID chip may connect between the third RAID chip and a first pair of SEDs from the plurality of SEDs. In some cases, the first RAID chip may make the first pair of SEDs appear as a first effectively single SED to the third RAID chip. In some embodiments, the second RAID chip may connect between the third RAID chip and a second pair of SEDs from the plurality of SEDs. In some cases, the second RAID chip may make the second pair of SEDs appear as a second effectively single SED to the third RAID chip. In some examples, the third RAID chip may make the first effectively single SED and the second effectively single SED appear as a single RAID drive to the drive interface bridge.

Figure 4:
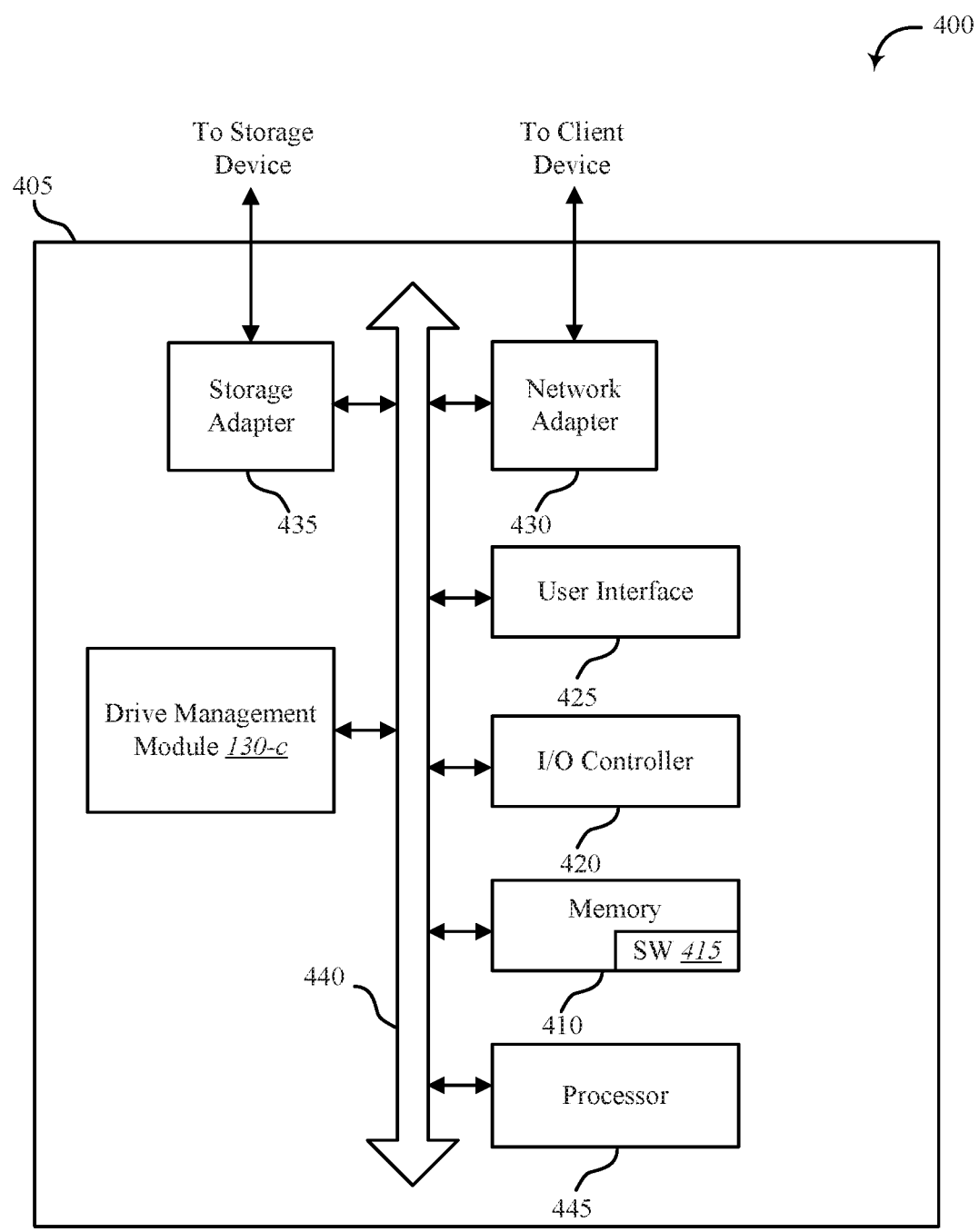
FIG. 4 shows a diagram of a system in accordance with various aspects of this disclosure.

FIG. 4 shows a system 400 for management of a RAID system of encrypted storage drives, in accordance with various examples. System 400 may include an apparatus 405, which may be an example of any one of device 105 of FIG. 1 and/or device 205 of FIG. 2.

Apparatus 405 may include components for bi-directional voice and data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include drive management module 130-c, which may perform the functions described above for the drive management module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the drive management module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage device 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
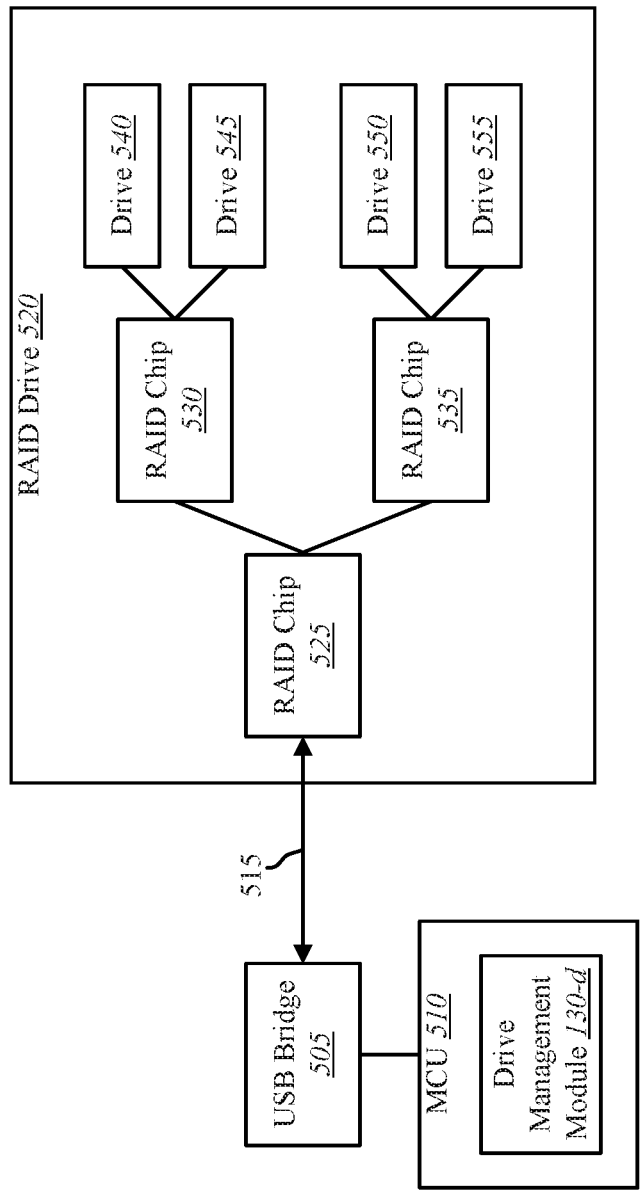
FIG. 5 shows one embodiment of an environment in accordance with various aspects of this disclosure.

FIG. 5 shows an environment 500 for management of a RAID system of encrypted storage drives, in accordance with various examples. At least one aspect of environment 500 may be implemented in conjunction with device 105 of FIG. 1, apparatus 205 of FIG. 2, and/or drive management module 130 depicted in FIGS. 1, 2, 3, and/or 4. In one embodiment, drive management module 130-d may be an example of any drive management module 130 depicted in FIGS. 1, 2, 3, and/or 4.

As depicted, environment 500 may include drive interface bridge 505, drive command initiator (MCU) 510, and RAID drive 520. MCU 510 may be one example of a drive command initiator. In one embodiment, MCU 510 may include drive management module 130-d. As shown, RAID drive 520 may include one or more RAID chips. For example, RAID drive 520 may include RAID chip 525, RAID chip 530, and RAID chip 530. In one embodiment, drive interface bridge 505 may include a connection 515 with RAID chip 525. In some cases, connection 515 may include a SATA connection.

As shown, RAID drive 520 may include one or more storage drives. For example, RAID drive 520 may include drive 540, drive 545, drive 550, and drive 555. In some cases, at least one of the drives of RAID drive 520 may be an encrypted drive or self-encrypting drive (SED). In some embodiments, RAID drive 520 may have less or more RAID chips than depicted in FIG. 5. Additionally or alternatively, RAID drive 520 may have less or more storage drives than depicted in FIG. 5.

As shown, drives 540-555 are behind two levels of RAID chips. In a conventional system, each RAID chip may block or fail to process certain commands sent or relayed by drive interface bridge 505, resulting in the drives 540-555 being inaccessible. In some cases, a host of a conventional system may be unable to pass through SATA commands to drives 540-555 due to the intervening drive interface bridge 505 and/or the RAID chips 525-535. However, MCU 510 may configure the RAID chips and perform one or more operations to make drives 540-555 accessible over drive interface bridge and to send one or more commands through the drive interface bridge 505 and RAID chips 525-535 to at least one of the drives 540-555 resulting in a data access operation on at least one of drives 540-555.

In one embodiment, each RAID chip 525-535 may be configured as port multipliers based on a reset operation. The reset operation may include a reset of RAID drive 520, a reset of one or more RAID chips 525-535, a reset of one or more drives 540-555, or a reset of a host of RAID drive 520, or any combination thereof. In some embodiments, drives 540-555 may be locked or inaccessible to a host of RAID drive 520 as a result of the reset operation and/or when the RAID chips 525-535 are configured as port multipliers. In one embodiment, when the drives 540-555 are locked, at least some of the data on drives 540-555 may be inaccessible to the host. As one example, drives 540-555 may include encrypted data and when drives 540-555 are locked the encrypted data may be inaccessible to the host.

In one embodiment, MCU 510 may unlock each of drives 540-555 based on a drive interface request received by drive interface bridge 505 from a host of RAID drive 520. In some cases, the drive interface request may include a request for data on at least one of drives 540-555. In one embodiment, MCU 510 may determine whether drives 540-555 are locked upon detecting the drive interface request. Upon determining the drives 540-555 are unlocked, MCU 510 may determine whether the RAID chips 525-535 are configured in a RAID mode (e.g., RAID0, RAID5, etc.). Upon determining the RAID chips 525-535 are in a RAID mode, MCU 510 may reset the RAID chips 525-535. In some cases, MCU 510 may reset RAID chips 525-535 without resetting RAID drive 520 and/or drives 540-555. In some cases, MCU 510 may unlock the drive interface bridge 505 and/or establish a connection between drive interface bridge 505 and a host of RAID drive 520. When drives 540-555 and drive interface bridge 505 are unlocked and the RAID chips are configured in the RAID mode, the host may access data on drives 540-555 (e.g., decrypted data on drive 540).

Upon determining the drives 540-555 are locked and/or data on drives 540-555 remains in an encrypted state, MCU 510 may perform one or more operations to unlock drives 540-555. In some cases, unlocking drives 540-55 may include decrypting encrypted data stored on drives 540-555. In one embodiment, MCU 510 unlocks each drive 540-555 individually. In some embodiments, MCU 510 unlocks each drive 540-555 while RAID chips 525-535 are configured in pass-through mode. In some cases, MCU 510 may perform an unlocking sequence to unlock each drive 540-555. Upon unlocking each of the SEDs, MCU 510 may configure RAID chips 525-535 to a RAID mode. In some cases, upon unlocking each of the SEDs, MCU 510 may activate a mass storage functionality of the drive interface bridge 505. In some cases, activating the mass storage functionality of the drive interface bridge 505 unlocks the drive interface bridge 505. In some cases, unlocking drive interface bridge 505 makes drive interface bridge 505 accessible to a host of RAID drive 520. In some cases, the host of RAID drive 520 is enabled to access data on drives 540-555 (e.g., encrypted data stored on drives 540-555) after the mass storage functionality of the drive interface bridge 505 is activated.

As one example, drives 540-555 may be SED drives. In the example, a host may send SED commands to drive interface bridge 505 to access data on drive 540. In some embodiments, the SED commands may be encrypted by a drive encryption key. In some cases, drive 540 may have the drive encryption key, enabling drive 540 to decrypt the SED commands. Drive 540 may also have a data encryption key. Thus, upon successfully decrypting the SED commands, drive 540 may use the data encryption key to decrypt the encrypted data stored on drive 540 and send the decrypted data to the host.

In one embodiment, MCU 510 configures each RAID chip 525-535 to a RAID mode after unlocking each drive 540-555. In some cases, MCU 510 sends a signal to each RAID chip 525-535 to change the configuration of the RAID chips 525-535. In some cases, MCU 510 sends a configuration signal to a configuration pin of each RAID chip 525-535 to modify the configuration of RAID chips 525-535. In some cases, MCU 510 may send a reset signal to each RAID chip 525-535 to reset the RAID chips 525-535. In some cases, MCU 510 sends a reset signal to a reset pin of each RAID chip 525-535 to reset the RAID chips 525-535. In some cases, MCU 510 broadcasts a configuration signal to each RAID chip 525-535 to modify the configuration of RAID chips 525-535. In some cases, MCU 510 sends a separate configuration signal to each RAID chip 525-535 to modify the configuration of RAID chips 525-535. In some cases, MCU 510 broadcasts a reset signal to each RAID chip 525-535 to reset the RAID chips 525-535. In some cases, MCU 510 sends a separate reset signal to each RAID chip 525-535 to reset the RAID chips 525-535.

In some cases, RAID chips 535-535 may be in a host managed mode upon reset. Accordingly, in some cases, MCU 510 may send one or more commands to RAID chips 535-535 to switch the RAID chips 535-535 to pass-through mode from host managed mode. After unlocking drives 540-555, MCU 510 may send one or more commands to RAID chips 535-535 to switch RAID chips 535-535 to a RAID mode. In some cases, MCU 510 may send commands to each of the RAID chips 535-535 to switch each of the RAID chips 535-535 to a RAID mode. In connection with switching the RAID chips 535-535 to RAID mode, MCU 510 may unlock drive interface bridge 505, making the data on drives 540-555 available to a host of RAID drive 520 via drive interface bridge 505. For example, once drives 540-555 are unlocked, the drive interface bridge 505 is unlocked, and the RAID chips 535-555 are switched to RAID mode, data that was inaccessible on drives 540-555 (e.g., because the data was encrypted) may be accessed via one or more drive interface requests by the host received via the drive interface bridge 505.

Figure 6:
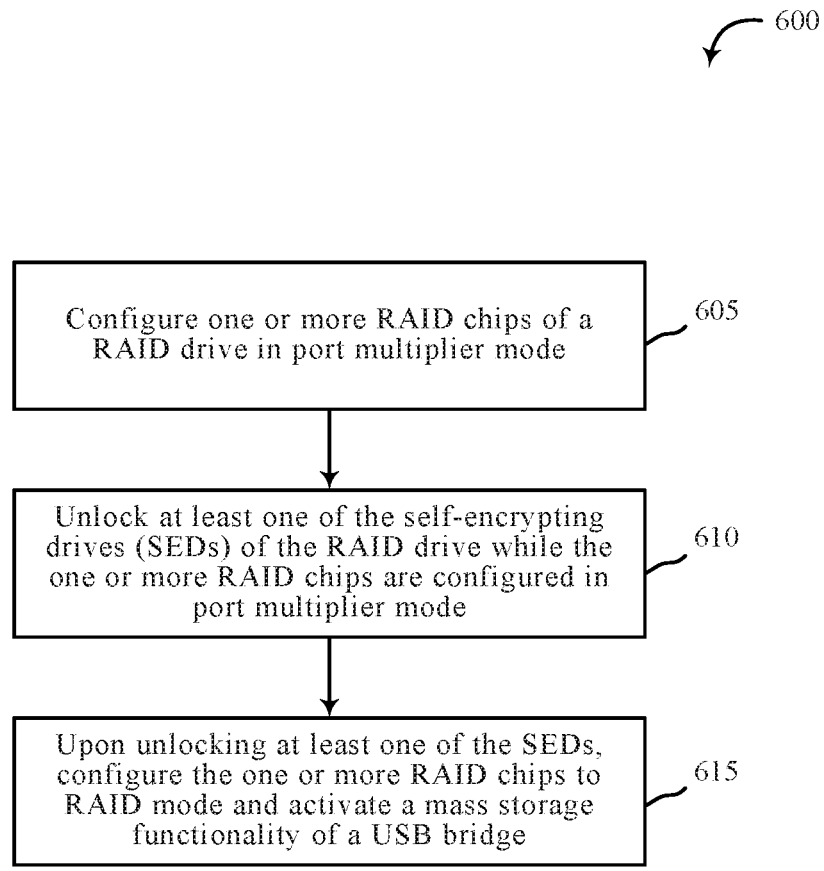
FIG. 6 is a flow chart illustrating an example of a method in accordance with various aspects of this disclosure.

FIG. 6 is a flow chart illustrating an example of a method 600 for management of a RAID system of encrypted storage drives, in accordance with various aspects of the present disclosure. One or more aspects of the method 600 may be implemented in conjunction with device 105 of FIG. 1, apparatus 205 of FIG. 2, and/or drive management module 130 depicted in FIGS. 1, 2, 3, 4, and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include configuring one or more RAID chips of a RAID drive in pass-through mode. At block 610, method 600 may include unlocking at least one of the SEDs of the RAID drive while the one or more RAID chips are configured in pass-through mode. At block 615, upon unlocking at least one of the SEDs, method 600 may include configuring the one or more RAID chips to RAID mode and activating a mass storage functionality of a drive interface bridge of the RAID drive.

The operation(s) at block 605-615 may be performed using the drive management module 130 described with reference to FIGS. 1-5 and/or another module. Thus, the method 600 may provide for management of a RAID system of encrypted storage drives. It should be noted that the method 600 is just one implementation and that the operations of the method 600 may be rearranged, omitted, and/or otherwise modified such that other implementations are possible and contemplated.

Figure 7:
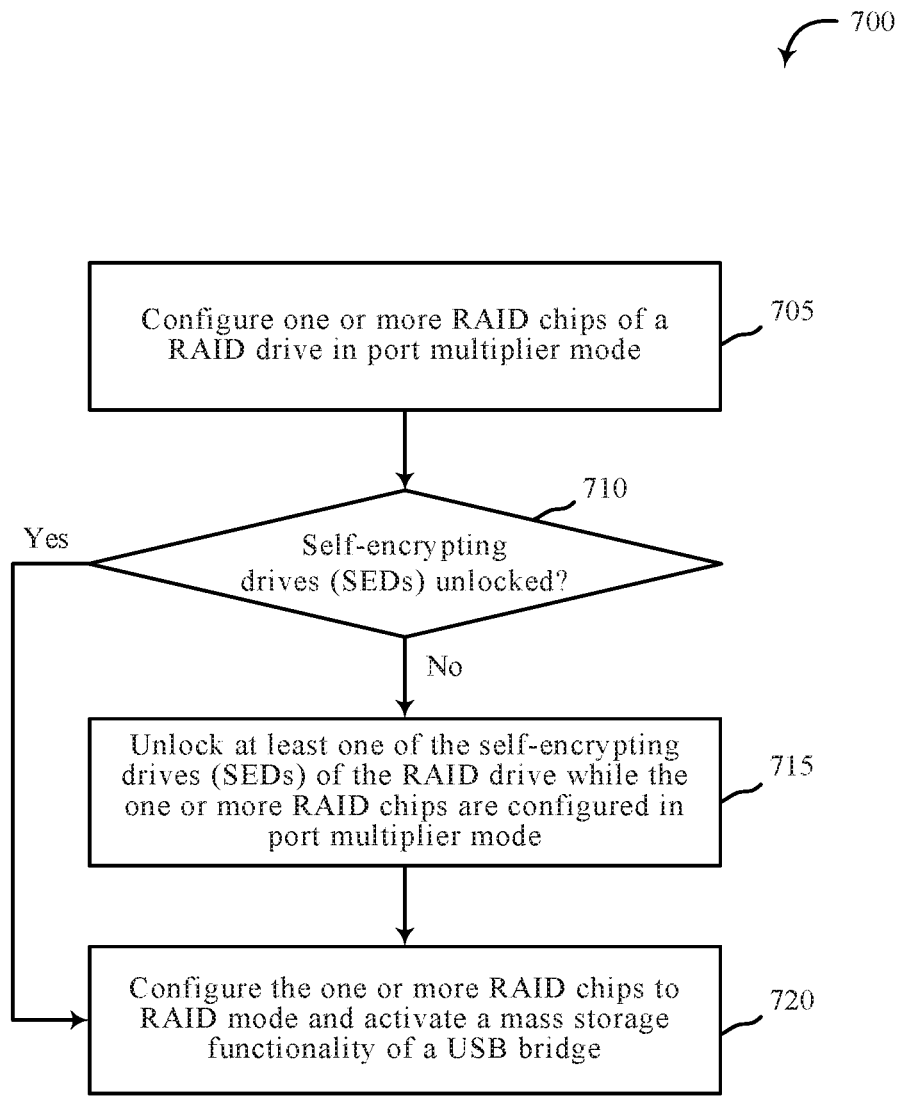
FIG. 7 is a flow chart illustrating an example of a method in accordance with various aspects of this disclosure.

FIG. 7 is a flow chart illustrating an example of a method 700 for management of a RAID system of encrypted storage drives, in accordance with various aspects of the present disclosure. One or more aspects of the method 700 may be implemented in conjunction with device 105 of FIG. 1, apparatus 205 of FIG. 2, and/or drive management module 130 depicted in FIGS. 1, 2, 3, 4, and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include configuring one or more RAID chips of a RAID drive in pass-through mode. In some cases, the RAID drive may include one or more self-encrypting drives (SEDs). At block 710, method 700 may include determining whether the SEDs of the RAID drive are unlocked. Upon determining the SEDs are unlocked, at block 720 method 700 may include configuring the one or more RAID chips to RAID mode and activating a mass storage functionality of a drive interface bridge of the RAID drive.

Upon determining the SEDs are locked, at block 715 method 700 may include unlocking each of the SEDs of the RAID drive while the one or more RAID chips are configured in pass-through mode. After unlocking each of the SEDs, at block 720 method 700 may include configuring the one or more RAID chips to RAID mode and activating a mass storage functionality of a drive interface bridge of the RAID drive to enable a host of the RAID drive to access data on the SEDs.

The operations at blocks 705-720 may be performed using the drive management module 130 described with reference to FIGS. 1-5 and/or another module. Thus, the method 700 may provide for management of a RAID system of encrypted storage drives. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, drive command initiator, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
    a plurality of self-encrypting drives (SEDs);
    one or more redundant array of independent disks (RAID) chips, the one or more RAID chips operable in a pass-through mode in which the one or more RAID chips are unable to treat the plurality of SEDs as a RAID volume even when all SEDs of the plurality of SEDs are unlocked, but are capable of permitting commands to be sent to individual SEDs of the plurality of SEDs, and an alternate RAID mode in which the one or more RAID chips are capable of treating the plurality of unlocked SEDs as the RAID volume;
    a drive interface bridge connecting between at least one of the one or more RAID chips and a machine host; and
    a drive command initiator communicatively coupled to the drive interface bridge, the drive command initiator being configured to:
        configure the one or more RAID chips in the pass-through mode that permits the drive command initiator to access each different SED of the plurality of SEDs individually;
        unlock at least one of the SEDs while the one or more RAID chips are configured in the pass-through mode; and
        upon unlocking at least one of the SEDs, configure the one or more RAID chips to the RAID mode and activate a mass storage functionality of the drive interface bridge, thereby presenting the plurality of SEDs as a single storage drive to the machine host.

2. The storage system of claim 1, wherein the unlocking of at least one of the SEDs includes performing an unlocking sequence, the unlocking sequence including at least receiving an unlocking command and sending an encryption key to the at least one SED.

3. The storage system of claim 2, wherein the encryption key is unique to a particular SED from the plurality of SEDs.

4. The storage system of claim 1, wherein the drive command initiator is further configured to:
    receive a request to unlock access to the SEDs from the drive interface bridge.

5. The storage system of claim 4, wherein the request includes a drive interface request for access via the drive interface bridge to data encrypted on at least one of the SEDs.

6. The storage system of claim 1, wherein the drive command initiator is further configured to:
 block drive interface access to the SEDs via the drive interface bridge while the one or more RAID chips are configured to the pass-through mode.

7. The storage system of claim 1, wherein the drive command initiator is further configured to:
 enable the drive interface bridge to present the SEDs to the machine host after at least one SED of the plurality of SEDs is unlocked and at least one of the one or more RAID chips is configured to the RAID mode.

8. The storage system of claim 1, wherein the drive command initiator is further configured to:
 unlock drive interface access to the SEDs via the drive interface bridge after the one or more RAID chips are configured to the RAID mode and the unlocking of the at least one SED.

9. The storage system of claim 1, wherein the one or more RAID chips include a first RAID chip, a second RAID chip, and a third RAID chip, the first RAID chip connecting between the third RAID chip and a first pair of SEDs from the plurality of SEDs, wherein the first RAID chip makes the first pair of SEDs appear as a first effectively single SED to the third RAID chip.

10. The storage system of claim 8, the second RAID chip connects between the third RAID chip and a second pair of SEDs from the plurality of SEDs, wherein the second RAID chip makes the second pair of SEDs appear as a second effectively single SED to the third RAID chip.

11. The storage system of claim 10, wherein the third RAID chip makes the first effectively single SED and the second effectively single SED appear as a single RAID drive to the drive interface bridge.

12. An apparatus comprising:
 a drive command initiator to:
  configure one or more redundant array of independent disks (RAID chips in a pass-through mode in which the one or more RAID chips are unable to treat a plurality of self-encrypting drives (SEDs) as a RAID volume even when all SEDs of the plurality of SEDs are unlocked, but permit commands to be sent to individual SEDs of the plurality of SEDs;
  unlock at least one of the plurality of SEDs while the one or more RAID chips are configured in the pass-through mode; and
  upon unlocking at least one of the SEDs, configure the one or more RAID chips to a RAID mode, which is alternate to the pass-through mode and in which the one or more RAID chips are capable of treating the plurality of unlocked SEDs as the RAID volume; and
  activate a mass storage functionality of a drive interface bridge of the apparatus when the one or more RAID chips are in the RAID mode.

13. The apparatus of claim 12, wherein the unlocking of at least one of the SEDs includes performing an unlocking sequence, the unlocking sequence including at least receiving an unlocking command and sending an encryption key to the at least one SED.

14. The apparatus of claim 13, wherein the encryption key is unique to a particular SED from the plurality of SEDs.

15. The apparatus of claim 12, wherein the drive command initiator is further configured to:
 receive a request to unlock access to the SEDs from the drive interface bridge.

16. The apparatus of claim 15, wherein the request includes a drive interface request for access via the drive interface bridge to data encrypted on at least one of the SEDs.

17. The apparatus of claim 12, wherein the drive command initiator is further configured to:
 block drive interface access to the SEDs via the drive interface bridge while the one or more RAID chips are configured to the pass-through mode.

18. The apparatus of claim 12, wherein the drive command initiator is further configured to:
 unlock drive interface access to the SEDs via the drive interface bridge after the one or more RAID chips are configured to the RAID mode and the unlocking of the at least one SED.

19. A method comprising:
 configuring one or more redundant array of independent disks (RAID) chips in a pass-through mode in which the one or more RAID chips are unable to treat a plurality of self-encrypting drives (SEDs) as a RAID volume even when all SEDs of the plurality of SEDs are unlocked, but permit commands to be sent to individual SEDs of the plurality of SEDs;
 unlocking at least one of the plurality of SEDs while the one or more RAID chips are configured in the pass-through mode; and
 upon unlocking at least one of the SEDs, configuring the one or more RAID chips to a RAID mode, which is alternate to the pass-through mode and in which the one or more RAID chips are capable of treating the plurality of unlocked SEDs as the RAID volume, and activating a mass storage functionality of a drive interface bridge of the apparatus, the unlocking of at least one of the SEDs comprising performing an unlocking sequence, the unlocking sequence including at least receiving an unlocking command from the drive interface bridge and sending an encryption key to the at least one SED.

20. The method of claim 19, wherein the encryption key is unique to a particular SED from the plurality of SEDs.

* * * * *